(12) United States Patent
Canossa

(10) Patent No.: US 8,118,374 B2
(45) Date of Patent: Feb. 21, 2012

(54) TRACK UNIT FOR MOVING A GROUND WORK VEHICLE

(75) Inventor: Riccardo Canossa, Revere (IT)

(73) Assignee: Tidue S.R.L., Remedello (IT)

( * ) Notice: Subject to any disclaimer, the term of this patent is extended or adjusted under 35 U.S.C. 154(b) by 162 days.

(21) Appl. No.: 12/453,846

(22) Filed: May 26, 2009

(65) Prior Publication Data

US 2009/0278403 A1 Nov. 12, 2009

(30) Foreign Application Priority Data

May 6, 2008 (IT) .............................. MN2008A0012

(51) Int. Cl.
*B62D 55/12* (2006.01)
*B62D 55/104* (2006.01)

(52) U.S. Cl. ..................... 305/135; 306/130; 306/132

(58) Field of Classification Search ................ 305/15, 305/116, 120, 124, 127, 128, 129, 130, 132, 305/135; 180/9.1, 9.5, 9.54
See application file for complete search history.

(56) References Cited

U.S. PATENT DOCUMENTS

| 5,273,126 | A | 12/1993 | Reed et al. | |
|---|---|---|---|---|
| 5,452,949 | A | 9/1995 | Kelderman | |
| 5,829,848 | A * | 11/1998 | Kelderman | 305/15 |
| 5,899,542 | A * | 5/1999 | Lykken et al. | 305/131 |
| 5,899,543 | A | 5/1999 | Lykken et al. | |
| 5,954,148 | A | 9/1999 | Okumura et al. | |
| 6,334,496 | B1 * | 1/2002 | Hiraki et al. | 180/9.5 |
| 6,601,664 | B2 * | 8/2003 | Hiraki et al. | 180/9.5 |
| 7,111,697 | B2 * | 9/2006 | Brazier | 180/9.21 |
| 7,478,688 | B2 * | 1/2009 | Ki | 180/9.1 |
| 2001/0030068 | A1 * | 10/2001 | Nagorkca et al. | 180/6.2 |
| 2002/0070059 | A1 | 6/2002 | Hikari et al. | |
| 2005/0061557 | A1 * | 3/2005 | Brazier | 180/9.21 |
| 2007/0107950 | A1 | 5/2007 | Ki | |
| 2008/0196947 | A1 * | 8/2008 | Brazier | 180/9.5 |

FOREIGN PATENT DOCUMENTS

JP 10181645 A * 7/1998
WO WO 2008/073990 A 6/2008

* cited by examiner

*Primary Examiner* — Joe Morano, IV
*Assistant Examiner* — Kip T Kotter
(74) *Attorney, Agent, or Firm* — Modiano & Associati; Albert Josif; Daniel O'Byrne

(57) ABSTRACT

A track unit for moving a ground work vehicle, comprising two elastic elements proximate to the front and rear ends, interposed between a monolithic upper portion of the structure that supports the driving wheel and a monolithic lower portion that supports two pairs of coaxial guiding wheels with parallel axles and resting rollers, means adapted to ensure a coplanar arrangement of the upper and lower portions of the structure being also provided.

5 Claims, 4 Drawing Sheets

TRACK UNIT FOR MOVING A GROUND WORK VEHICLE

The present invention relates to a track unit for moving a ground work vehicle.

BACKGROUND OF THE INVENTION

It is known that several types of ground work vehicles, such as agriculture machines or earth-moving machines or machines for geophysical research, are provided, instead of with the wheels of at least one axle, with track units that comprise a structure for supporting a driving wheel that moves a track in contact with guiding wheels and resting rollers connected with the structure.

In certain types of track units, such supporting structure is monolithic, but there are also track systems in which the structure proper is divided into two portions connected by means of elastic coupling means in order to provide users with a certain comfort.

However, the background art provides embodiments of such track units that are not entirely satisfactory, and therefore the aim of the present invention is to provide a track unit that has great simplicity and maximum functional efficiency.

SUMMARY OF THE INVENTION

This aim is achieved by a track unit for moving a ground work vehicle, according to the invention, characterized in that it comprises the features given in the appended claims.

BRIEF DESCRIPTION OF THE DRAWINGS

Further characteristics and advantages of the track unit according to the invention will become better apparent from the description of two preferred but not exclusive embodiments thereof, illustrated by way of non-limiting example in the accompanying drawings, wherein.

DESCRIPTION OF THE PREFERRED EMBODIMENTS

Figure 1:
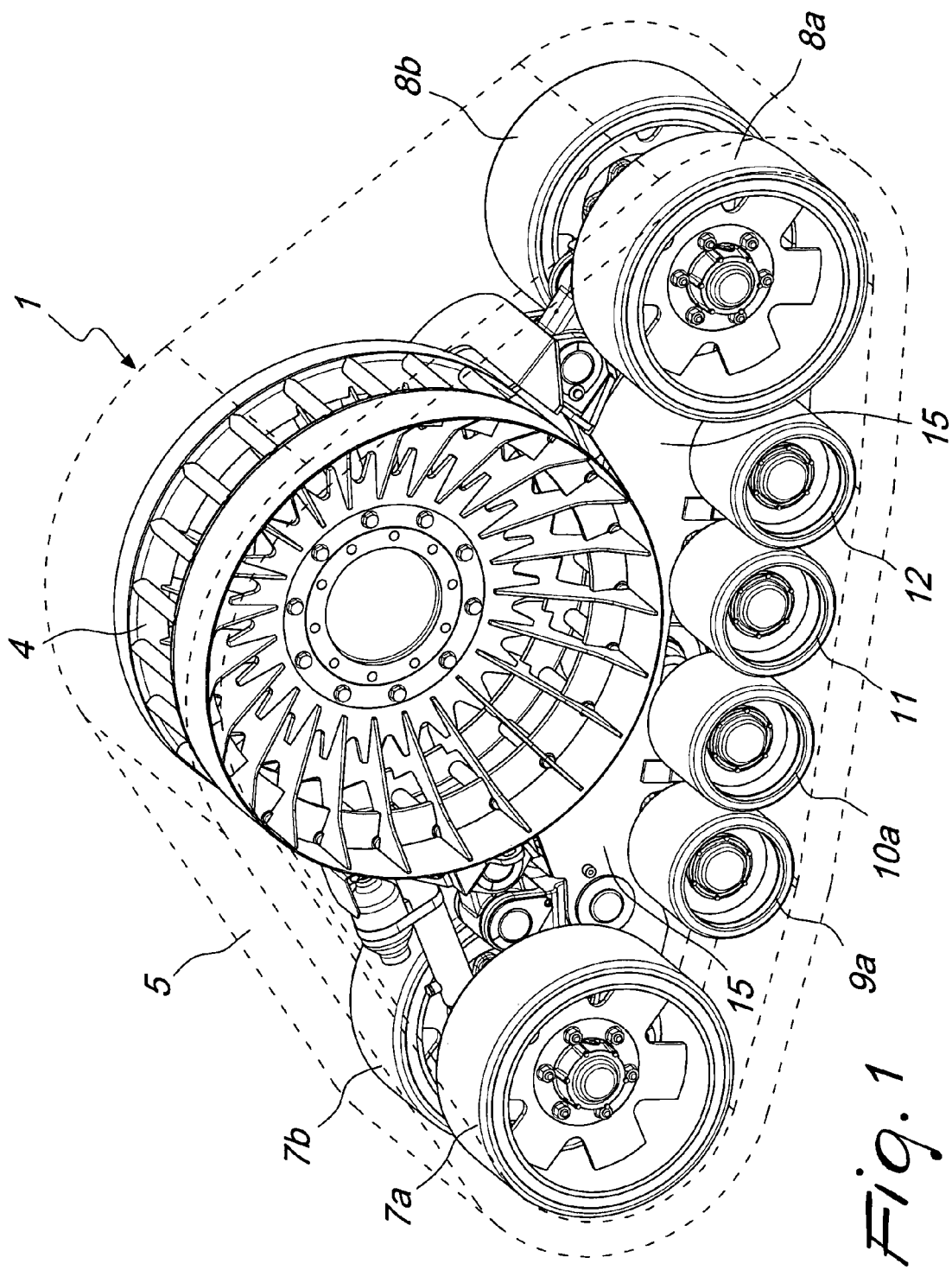
FIG. 1 is a perspective view of the track unit according to the invention, with the track shown in dot-and-dash lines.
Figure 2:
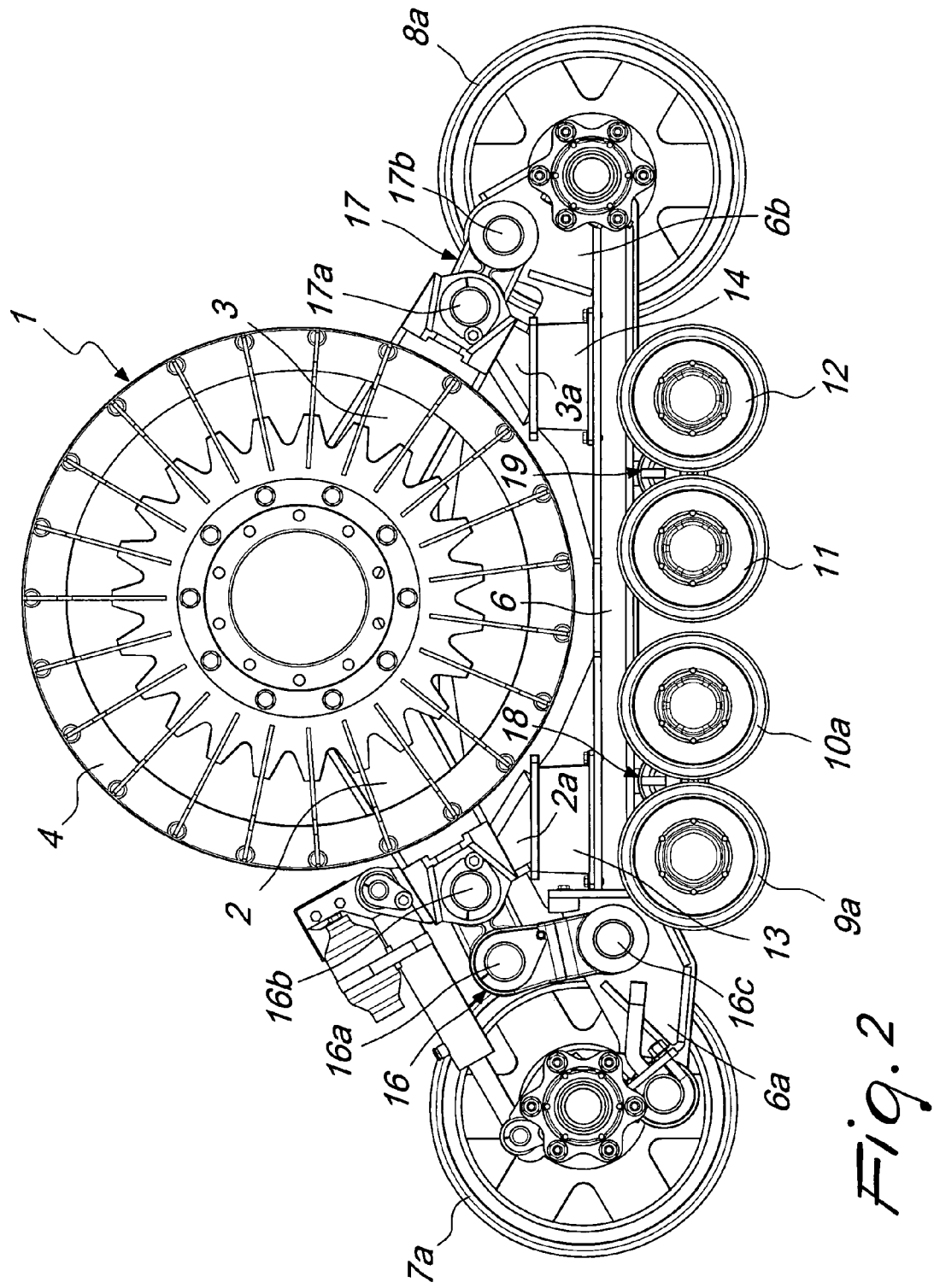
FIG. 2 is a side view of the track unit according to the invention, with a fairing and the track removed for reasons of illustration.
Figure 3:
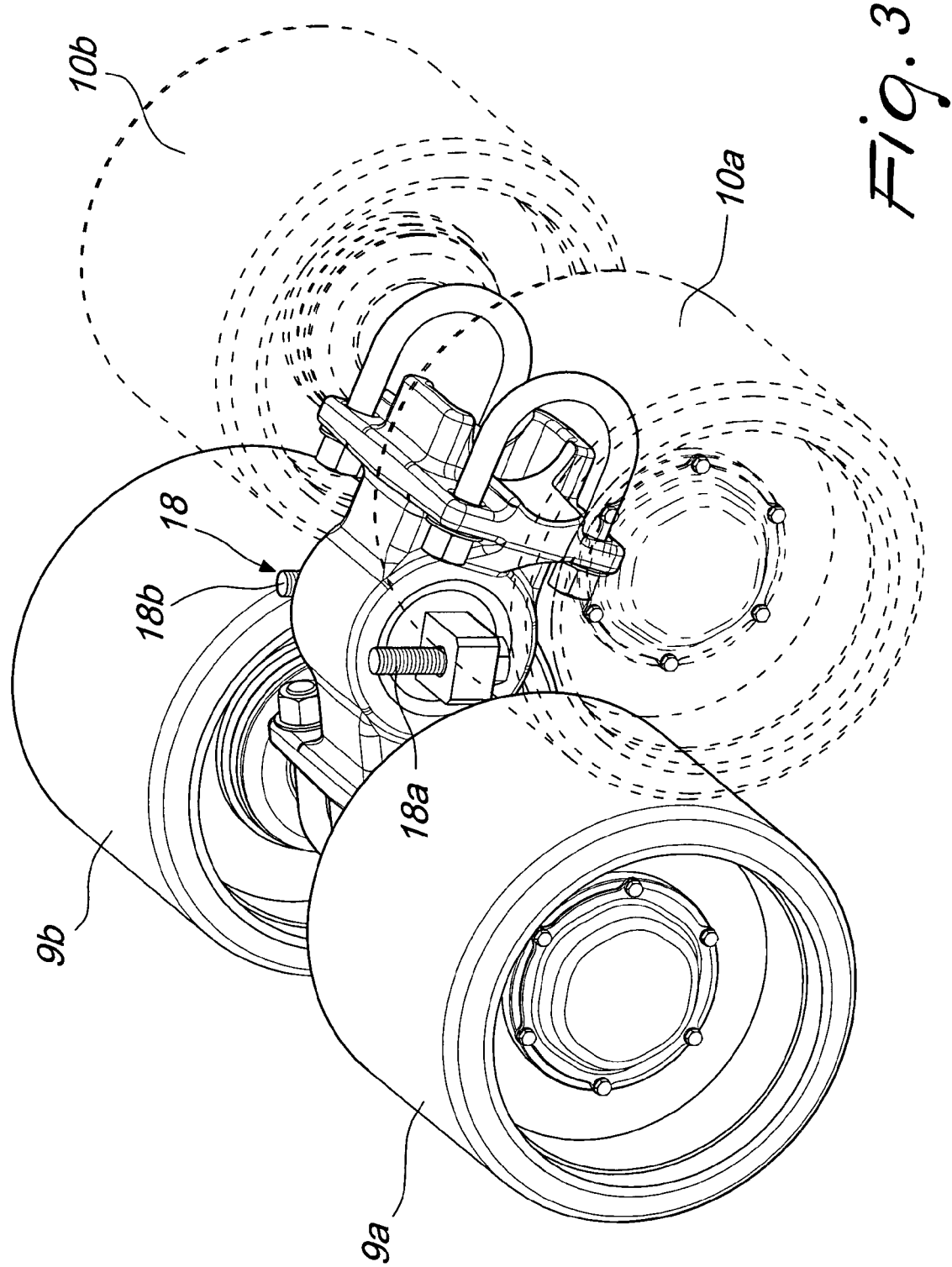
FIG. 3 is a view of a detail of FIG. 1, with a pair of rollers shown in dot-and-dash lines.

With reference to the FIGS. 1, 2, 3, the reference numeral 1 generally designates the track unit according to the invention, which comprises a supporting structure divided into two portions.

The first upper portion of the structure comprises two strong profiles 2 and 3, which are monolithically connected, with the corresponding plates 2a, 3a, such upper portion supporting the driving wheel 4 that moves the track 5.

The second lower portion of the structure comprises the longitudinal member 6 with the monolithically connected plates 6a, 6b, and such monolithic portion supports with parallel axles the front and rear guiding wheels of the track 5, and more precisely the front pair of coaxial wheels 7a, 7b and the rear pair of coaxial wheels 8a, 8b.

Such second portion 6 further supports the resting rollers that are mounted in pairs on four axles: the reference numerals 9a, 9b designate the rollers mounted on the first axle, the numerals 10a, 10b designate the rollers mounted on the second axle, and the numerals 11 and 12 designate two rollers mounted respectively on the third axle and on the fourth axle.

The portion of the track 5 that runs between the guiding wheels 7a, 7b and 8a, 8b, and at the resting rollers mounted on the four intermediate axles, is the one that makes contact with the ground.

Two elastic elements are interposed between the two monolithic structure portions described, are arranged respectively proximate to the front and rear ends and are formed by the monolithic blocks 13 and 14, which are made of elastic material and are coupled to the longitudinal member 6 and to the plates 2a, 3a, which are shown in FIG. 2, whereas in FIG. 1 they are hidden behind the fairing 15.

Moreover, there are means adapted to ensure a coplanar arrangement of the upper and lower portions of the structure, such means comprising two linkages arranged respectively proximate to the front and rear ends and pivoted on said portions.

The front linkage, generally designated by the reference numeral 16, is articulated in an intermediate position by means of the pivot 16a, and is pivoted to the upper and lower portions of the structure respectively by means of the pivots 16b, 16c; the rear linkage 17 is hinged to the upper and lower portions of the structure respectively by means of the pivots 17a, 17b, and also has the function of opposing any longitudinal forces that are parallel to the ground and are generated on the lower portion and to which the elastic elements 13 and 14 are unable to provide any force opposition.

The two front axles, i.e., those that support the resting rollers 9a, 9b and 10a, 10b, respectively, are connected by the spherical joint provided with a rocker, generally designated by the reference numeral 18 and shown in particular in FIG. 3, which is fixed to the lower portion of the structure by means of the threaded stems 18a, 18b, and a similar spherical joint, designated by the reference numeral 19, is interposed between the third axle and the fourth axle.

Advantageously, such spherical joints are of the elastic type.

Figure 4:
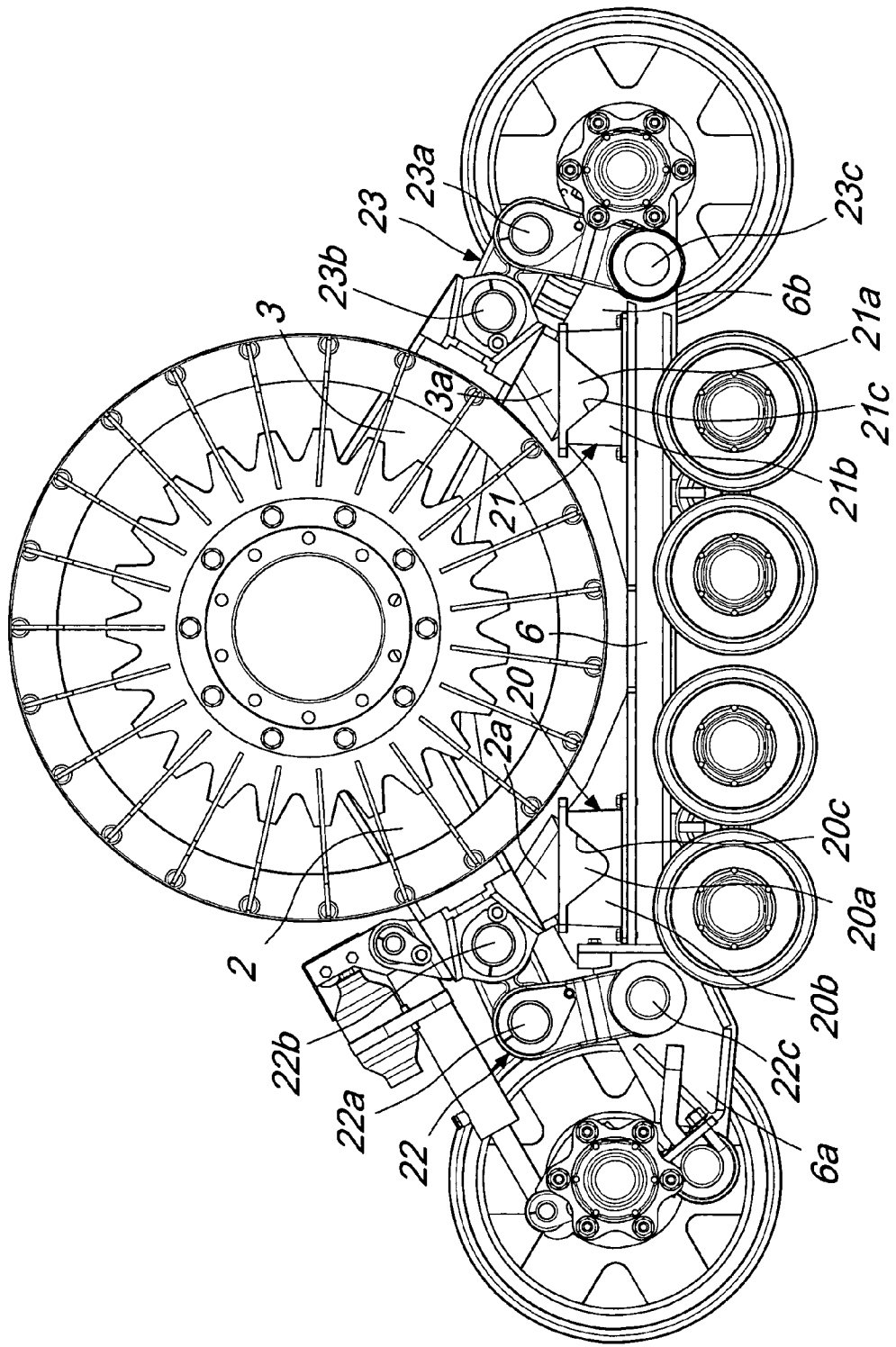
FIG. 4 is a side view similar to FIG. 2, according to another embodiment.

FIG. 4 illustrates a further embodiment of the track unit according to the invention, in which between the upper portion of the structure that comprises the profiles 2 and 3 with the corresponding plates 2a, 3a and the lower portion that comprises the longitudinal member 6 with the corresponding plates 6a, 6b elastic elements are interposed, generally designated by the reference numerals 20 and 21, which are shaped so as to provide opposition to longitudinal forces that are parallel to the ground and might be applied to the lower portion of the structure.

The elastic element 20 comprises two components 20a, 20b, which are coupled respectively to the plate 2a of the upper portion of the structure and to the longitudinal member 6 of the lower portion, and likewise the elastic element 21 comprises two components 21a, 21b, which are coupled respectively to the plate 3a and to the longitudinal member 6, and the surface in mutual contact of said components, designated respectively by the reference numerals 20c, 21c, is V-shaped; in this manner, it is possible to generate a reaction for opposing the longitudinal forces that are parallel to the ground as mentioned above, and the surface in mutual contact of the two components can be contoured according to several shapes that are different from the one shown.

Of course, the means adapted to ensure the coplanar arrangement of the two portions of the structure are no longer involved in opposing said forces, and therefore are shaped according to the two linkages 22, 23, which are articulated in an intermediate position by means of the pivots 22a, 23a and are binged on the upper portion of the structure by means of the pivots 22b, 23b, respectively, and on the lower portion by means of the pivots 22c, 23c, respectively.

The described invention is susceptible of numerous modifications and variations, all of which are within the scope of the appended claims; all the details may further be replaced with other technically equivalent elements.

The disclosures in Italian Patent Application No. MN2008A000012 from which this application claims priority are incorporated herein by reference.

What is claimed is:

1. A track unit for moving a ground work vehicle, comprising:
    a track,
    a driving wheel which is adapted to transmit motion to said track,
    a front pair of coaxial guiding wheels arranged at a front end of the track unit and a rear pair of coaxial guiding wheels arranged at a rear end of the track unit,
    intermediate resting rollers arranged between said front and rear pairs of coaxial guiding wheels,
    a monolithic upper portion structure that supports the driving wheel, said monolithic upper portion structure comprising two profiles which are monolithically connected and which support said driving wheel and which extend respectively forwardly and rearwardly from said driving wheel,
    a monolithic lower portion structure comprising a longitudinal member that supports the two pairs of coaxial guiding wheels and the intermediate resting rollers,
    two linkages arranged respectively proximate to said front and rear ends and pivoted by means of pivots respectively on said two profiles and on said longitudinal member,
    two elastic elements located respectively proximate to said front and rear ends and interposed between said two profiles and said longitudinal member, and
    at least one of said linkages being articulated in an intermediate position by means of an intermediate pivot arranged between the pivots for pivoting said at least one linkage to the two profiles and longitudinal member respectively.

2. The track unit according to claim 1, wherein said elastic elements comprise monolithic blocks made of elastic material.

3. The track unit according to claim 1, wherein both of said linkages are articulated in an intermediate position by means of an intermediate pivot arranged between the pivots for pivoting said linkages to the two profiles and longitudinal member respectively.

4. The track unit according to claim 1, further comprising at least one spherical joint which is interposed between adjacent pairs of said resting rollers and the lower portion of the structure.

5. The track unit according to claim 4, wherein said at least one spherical joint is an elastic spherical joint.

* * * * *